United States Patent
Thompson et al.

(10) Patent No.: US 10,753,751 B2
(45) Date of Patent: Aug. 25, 2020

(54) SYSTEMS AND METHODS FOR STREET LEVEL ROUTING

(71) Applicant: ARRIS Enterprises, Inc., Suwanee, GA (US)

(72) Inventors: Stuart Thompson, Aloha, OR (US); Robert Gardner, Portland, OR (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/860,702

(22) Filed: Sep. 21, 2015

(65) Prior Publication Data
US 2016/0084662 A1    Mar. 24, 2016

Related U.S. Application Data

(60) Provisional application No. 62/052,995, filed on Sep. 19, 2014.

(51) Int. Cl.
*G01C 21/34* (2006.01)
*G06Q 10/04* (2012.01)

(52) U.S. Cl.
CPC .......... *G01C 21/34* (2013.01); *G01C 21/343* (2013.01); *G06Q 10/04* (2013.01); *G06Q 10/047* (2013.01)

(58) Field of Classification Search
None
See application file for complete search history.

(56) References Cited

U.S. PATENT DOCUMENTS

| | | | |
|---|---|---|---|
| 5,111,391 A | 5/1992 | Fields et al. | |
| 7,869,946 B2 | 1/2011 | Couckuyt et al. | |
| 8,849,689 B1 | 9/2014 | Jagannathan et al. | |
| 2006/0241986 A1 | 10/2006 | Harper | |
| 2006/0262967 A1 | 11/2006 | Hurst et al. | |
| 2011/0137698 A1* | 6/2011 | Meyer ................ | G06Q 10/00 705/7.13 |

(Continued)

FOREIGN PATENT DOCUMENTS

EP    1505370 A1    2/2005

OTHER PUBLICATIONS

PCT Search Report & Written Opinion, Re: Application No. PCT/US2015/051288, dated Dec. 4, 2015.

(Continued)

*Primary Examiner* — Rami Khatib
(74) *Attorney, Agent, or Firm* — Chernoff, Vilhauer, McClung & Stenzel, LLP

(57) ABSTRACT

A system and method for street level routing includes dividing a mapping of a geospatial region into cells, each cell having one or more pathways located within the cell. A traversability weighting is determined for each of the cells, based at least on a traversability measure associated with the one or more pathways located within the respective cell. Total weights associated with one or more routes for traversing every cell to every other cell are pre-calculated, and the pre-calculated total weights are used to determine one or more routes between a first point and a second point in the geospatial region, with one or more preferred routes determined in accordance with a ranking of the one or more routes between the first cell and the second cell, the ranking based on one or more efficiency criteria.

6 Claims, 17 Drawing Sheets

(56) References Cited

U.S. PATENT DOCUMENTS

| | | | | |
|---|---|---|---|---|
| 2011/0307838 | A1* | 12/2011 | Dwyer | G06T 11/206 715/854 |
| 2012/0253660 | A1* | 10/2012 | Dillahunt | G01C 21/3415 701/423 |
| 2013/0231862 | A1 | 9/2013 | Delling et al. | |

OTHER PUBLICATIONS

M. Dorigo, et al., "The ant system: optimization by a colony of cooperating agents", IEEE Transactions on Systems, Man and Cybernetics—Part B, vol. 26, No. 1, 1996, 26 pgs.

L.M. Gambardella, et al., "Solving symmetric and asymmetric TPSs by ant colonies", IEEE Conference on Evolutionary Computation, 1996, pp. 622-627.

L.M. Gambardella, et al., "MACS-VRPTW: A Multiple Ant Colony System for Vehicle Routing Problems with Time Windows", In D. Corne, et al. as editors, New Ideas in Optimization, 1999, 17 pgs.

L.M. Gambardella, et al., "An Ant Colony System Hybridized with a New Local Search for the Sequential Ordering Problem", INFORMS Journal on Computing, vol. 12, No. 3, Summer 2000, pp. 237-255.

L.M. Gambardella, et al., "Ant Colony Optimization for Vehicle Routing Problems: From Theory to Applications", Galleria Rassegna Bimestrale di Cultura 9, No. 1, pp. 1-50, 2004.

M. Constantino, et al., "The mixed capacitated arc routing problem with non-overlapping routes", European Journal of Operational Research, vol. 244, Issue 2, pp. 445-456, Jul. 2015 (available online Jan. 29, 2015).

B.L. Hollis, et al., "Real-Life Vehicle Routing with Time Windows for Visual Attractiveness and Operational Robustness", Asia-Pacific Journal of Operational Research, vol. 29, No. 4, 1250017-1 [29 pages], DOI: 10.142/S0217595912500170, Aug. 2012.

ClickSoftware Technologies Ltd., "Street-Level Routing: Where the Rubber Meets the Road", URL:www.clicksoftware.com/globalassets/aasite_assets/documents/bp/bp_street-level-routing_en.pdf, 12 pages, 2014.

"OptaPlanner User Guide", jboss.org, Community Documentation, Version 6.0.0, 137 pgs.

P. Kilby, et al., "Flexible routing combing Constraint Programming, Large Neighbourhood Search, and Feature-based Insertion", Proceedings on 2nd Workshop on Artificial Intelligence and Logistics, 22nd International Joint Conference on Artificial Intelligence (IJCAI), edited by K. Schill, et al. on Jul. 16, 2011, pp. 43-48.

A. Poot, et al., "A Savings Based Method for Real-Life Vehicle Routing Problems", Econometric Institute Report EI9938/A, Aug. 1, 1999, pp. 1-18.

G. Rand, "The life and times of the Savings Method for Vehicle Routing Problems", ORiON, vol. 25(2), 2009, pp. 125-145.

V. Tam, et al., "An Effective Search Framework Combining Meta-Heuristics to Solve the Vehicle Routing Problems with Time Windows", Intechopen, 2008, 23 pgs.

R. Garrido, et al., "Natural Behavior Based Metaheuristics for the Vehicle Routing Problem with Time Window", NICSO 2006, Proceedings of the Workshop on Nature Inspired Cooperative Strategies for Optimization, edited by D. Pelta, et al. pp. 15-24.

C. Gretton, et al., "A Study of Shape Penalties in Vehicle Routing", Optimisation Research Group, NICTA, 4 pgs.

M. Hosny, "Heuristic Techniques for Solving the Vehicle Routing Problem with Time Windows", 2011 International Conference on Future Information Technology, IPCSIT vol. 13, 2011, pp. 19-23.

\* cited by examiner

SYSTEMS AND METHODS FOR STREET LEVEL ROUTING

BACKGROUND

Finding an optimal travel route for field service representatives (FSRs) and their jobs is an NP-complete problem (i.e., traveling salesman) that has been computationally impractical to solve through traditional means. Efficient travel through a region may not be achievable through straight paths, e.g., due to roads, traffic, and various impediments. Determining the optimal route between multiple points at the time of routing tends to reduce the efficiency of the routing algorithm. Street level routing (SLR), due to the significant number of permutations of potential paths, has traditionally been regarded as computationally impractical.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

Figure 1A:
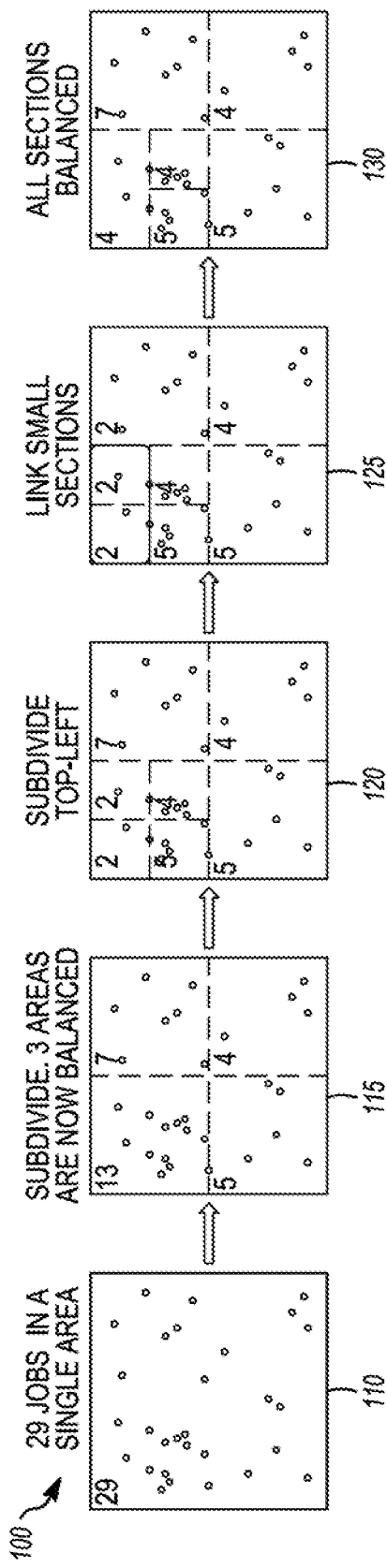
FIG. 1A depicts an illustrative example of division by job count, in accordance with an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Aspects of the present disclosure provide that before a route can be assembled, the cost of transitioning between cells within a region must be pre-determined. In an illustrative embodiment, traversability between two cells is determined based upon both the major road networks within that area and the weight of a given segment. In an illustrative embodiment, the distance from a major road as well as the cost of transitioning to that road provide a cost weighting for getting from one cell to another. In a further illustrative embodiment, applying a known algorithm known as Ant Colony Optimization (ACO), a weighted cost of transitioning from any one cell to another can be pre-calculated in a near street level fashion, herein sometimes referred to as Hybrid Street Level Routing. In embodiments, pre-calculation of these cell to cell transitions enables an aspect of the well-known "traveling salesman problem" to be flattened, providing a more efficient or optimized calculation while retaining a more substantially accurate view of how an FSR may traverse a region.

Examples of illustrative embodiments are able to address a problem such as the following illustrative scenario: A pool of technicians must collectively service a set of jobs distributed over a geographic area. Jobs may only be serviced within certain time windows, and technicians have restrictions upon the jobs they can perform. Routes must be determined for each technician such that all jobs are serviced with optimal routes being selected based upon a set of control parameters. These criteria include factors such as total travel time and distance, slack time between jobs, capacity overage, and appetite for risk. These values represent the business policy and therefore the trade-offs that are considered when determining an optimal solution. Solutions must be continually updated to react to unpredictable changes such as job overrun, job underrun, cancellations, and the optimizations that arise as a result. Stability is valued and therefore optimizations should be tactical and justify benefits above a set of configured thresholds. These parameters provide further opportunities to enforce business-specific policies.

With respect to visibility and transparency, aspects of the present disclosure provide the ability to visualize and audit the decision-making process, not only in the determination of initial routes but also in the tactical optimizations that are performed to adapt to changing conditions throughout the workday. These audit capabilities allow system administrators to understand the justification behind route choices, which may not seem logical on the surface but may be substantiated with significant business benefits. This feedback can be used to investigate certain scenarios and further refine and improve the control parameters used to enforce business policy across the enterprise.

Further aspects of the present disclosure address providing information to a human user, or for providing results in scenarios and simulations. In addition, while embodiments can provide solutions in the majority of cases, scenarios can arise where embodiments cannot find a solution without violating business policies. In these situations, human input may be necessary to resolve the problem. In order for a human user such as a field service dispatcher (FSD) to understand the consequences of their decisions, the solution should provide an ability to simulate the outcomes of certain choices. This allows different scenarios to be evaluated prior to making modifications to actual routes.

Static vs. Dynamic VRP

Vehicle routing problems (VRP) with time windows are an extension of a classic vehicle routing problem. Vehicle routing problems with time windows (VRPTW) extend the problem to require additionally that the service at each location must start and end within an associated time window. In static systems the visited locations are known a priori; schedules are not modified during the working day.

Due to recent advances in communications infrastructure, modern vehicle routing problems are increasingly dynamic and stochastic. Dynamic vehicle routing problems (DVRP) typically incorporate schedules that change or are only discovered during the course of a working day. Appointments may be introduced progressively or initial schedules may be augmented with new visits as the day progresses. In the case of a stochastic problem, statistical models are used to predict the revelation of new or modified visits throughout a day.

An illustrative embodiment is able to provide three major services: (1) initial route determination, (2) continual route optimization, and (3) event-based adjustments to previously determined routes.

1. Initial Route Determination

An embodiment providing an approach to the problem of Initial Route Determination is presented herein as a pipeline wherein components of the problem are considered individually and addressed in sequence to build a solution as a whole. For example, in a high level view of the solution, some embodiments can be described as including such steps as: automatic determination of routing areas, initial routing area assignments, vertex weight calculations, initial route propositions (ACO process), route shape validation (e.g., hull testing), neighbor optimizations (e.g., regional trades), vertex weight and route weight validation, and heuristics optimizations.

2. Continual Optimization

In addition to the initial route determination outlined above, an embodiment of a routing engine is able to continually seek optimizations and respond to events that occur. A process of continual optimization allows for routes to be improved as a working day progresses.

3. Event-Based Adjustments

As events occur throughout the day, an embodiment of the routing engine will respond by updating routes and sending notifications as appropriate to maximize efficiency in the updated model. Business rules dictate how situations such as job cancellation, job overrun, job underrun, and other unexpected circumstances can be resolved. The routing engine will attempt to compensate for the change in circumstances while making the minimum amount of changes to maintain route stability wherever possible. In cases where no solution can be found, the routing engine presents possible choices to a human dispatcher in order to reach a resolution.

The following is an analysis of components of an illustrative embodiment.

Automatic Determination of Routing Areas

A larger geographic area can be split into smaller areas in order to simplify the problem space and allow solutions to seek in parallel. Rather than performing this task manually, an algorithmic approach can be employed. Procedurally, the routing areas are determined based upon a number of different factors including topologic and geographic elements such as roads and waterways, as well as balancing heuristics such as job weights, depot presence, and technician start locations.

Quad-Tree Subdivision

Figure 1B:
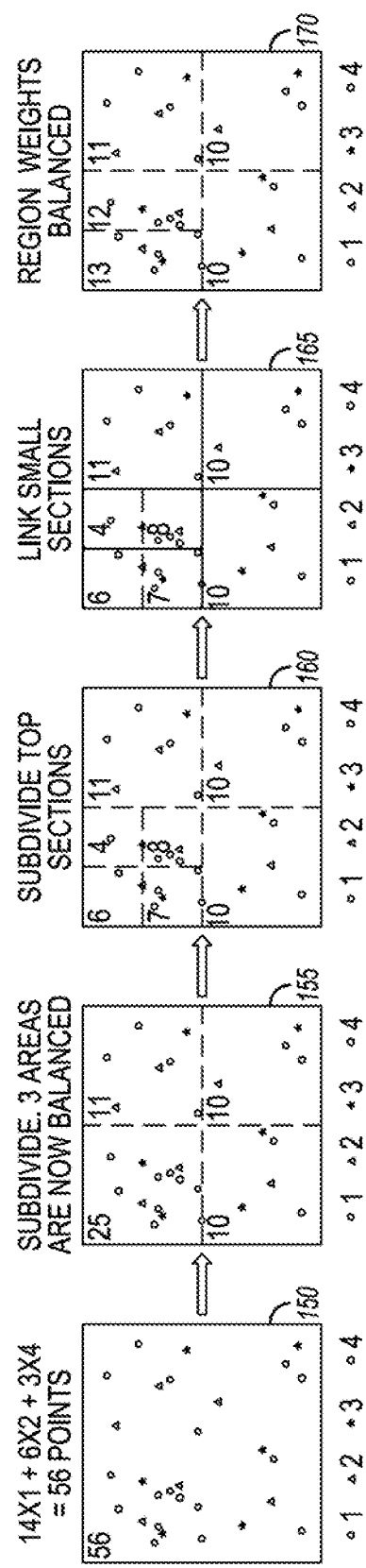
FIG. 1B depicts an illustrative example of division by job weight, in accordance with an embodiment.

FIG. 1A and FIG. 1B depict, in accordance with an embodiment, a simple form of subdivision in which routing areas can be subdivided using a quad-tree with balancing based upon statistics such as job count or job weight.

FIG. 1A depicts an illustrative example of division by job count, in accordance with an embodiment. In the example of an embodiment depicted in FIG. 1A, a method 100 includes a step 110 of determining locations of jobs in a single geographic area. In FIG. 1A's depiction of an example of step 110, twenty-nine jobs (represented by dots) are to be scheduled within the single geographic area represented by a square. In step 115, the geographic area is subdivided into a number of areas for balancing. For quad-tree subdivision, for example, the geographic area is subdivided into four areas, e.g., by dividing the square into four equal divisions as depicted. In FIG. 1A's depiction of an example of step 115, three of the subdivisions can be considered balanced based on a job count, because the number of jobs (13) in the top left subdivision or quadrant differs significantly from the number of jobs (7, 5, and 4, respectively) in each of the remaining three subdivisions; accordingly the top left quadrant is imbalanced. Existence of such an imbalance may be determined based, for example, on a deviation from a norm or average of the job count within each of the subdivisions. In step 120, subdivisions that are imbalanced are each further subdivided by quad-tree subdivision into four areas. Accordingly, in the depiction of an example of step 120, only the top left subdivision is further subdivided. When the top left subdivision is itself divided into four subdivisions, the thirteen jobs are also divided among its four subdivisions (2, 2, 5, and 4, respectively). In step 125, small sections are linked. In the depiction of an example of step 125, the original geographic area is now subdivided into seven parts, and two subdivisions are not balanced because they each contain a significantly smaller number of jobs (2 jobs and 2 jobs, respectively) than the remaining subdivisions; therefore, the two small sections are linked or recombined. In step 130, all sections are balanced. Accordingly, in the depiction of an example of step 130, as a result of the balancing, the original geographic area is now subdivided into six subdivisions, which are all now balanced, containing 4, 5, 4, 7, 5, and 4 jobs, respectively.

FIG. 1B depicts an illustrative example of division by job weight, in accordance with an embodiment. In the example of an embodiment depicted in FIG. 1B, a method 140 includes a step 150 of determining locations of jobs in a single geographic area, wherein jobs are given a weight. In FIG. 1B's depiction of an example of step 150, jobs having a weight of 1 are depicted by a solid circle, jobs having a weight of 2 are depicted by a triangle, jobs having a weight of 3 are depicted by a star, and jobs having a weight of 4 are depicted by a hollow hexagon. Accordingly, in the illustrative example in FIG. 1B's depiction of step 150, the 29 jobs shown in FIG. 1A have been weighted (e.g., based on a previously determined measure of priority or importance), resulting in 14 jobs each having a weight of 1 point, 6 jobs each having a weight of 2 points, 6 jobs each having a weight of 3 points, and 3 jobs each having a weight of 4 points, thus resulting in a job weight total of 56 points in the depicted geographic area. In step 155, the geographic area is subdivided into a number of areas for balancing. For quad-tree subdivision, for example, the geographic area is subdivided into four areas, e.g., by dividing the square into four equal divisions as depicted. In FIG. 1B's depiction of an example of step 155, three of the subdivisions can be considered balanced based on a job count, because the number of points (25) in the top left subdivision or quadrant differs significantly from the number of jobs (11, 10, and 10, respectively) in each of the remaining three subdivisions; accordingly the top left quadrant is imbalanced. Existence of such an imbalance may be determined based, for example, on a deviation from a norm or average of the job count within each of the subdivisions. In step 160, imbalanced sections (e.g., top sections by total job weighting) are subdivided. In the depiction of an example of step 160, any subdivisions that are imbalanced—in this case, only the top left subdivision—are further subdivided into four areas by quad-tree subdivision. Accordingly, in the depiction of an example of step 160, when the top left subdivision is itself divided into four subdivisions, the 25 points are also divided among its four subdivisions (6, 4, 7, and 8, respectively). In step 165, small sections are linked. In the depiction of an example of step 165, the original geographic area is now subdivided into seven parts, and the four subdivisions that were formed from the top left subdivision are not balanced because they each contain a significantly smaller number of points than the remaining subdivisions; therefore, the four small sections are linked or recombined into two sections by pairing the 6 point section with the 7 point section, and pairing the 4 point section with the 8 point section, to obtain the most balanced result. In step 170, region weights are balanced. As a result of the balancing, in the depiction of an example of step 170, the original geographic area is now subdivided into five subdivisions, having region weights which are now all balanced (by job points), containing jobs having 13, 12, 11, 10, and 10 job points, respectively.

Topological Constraints

Figure 2:
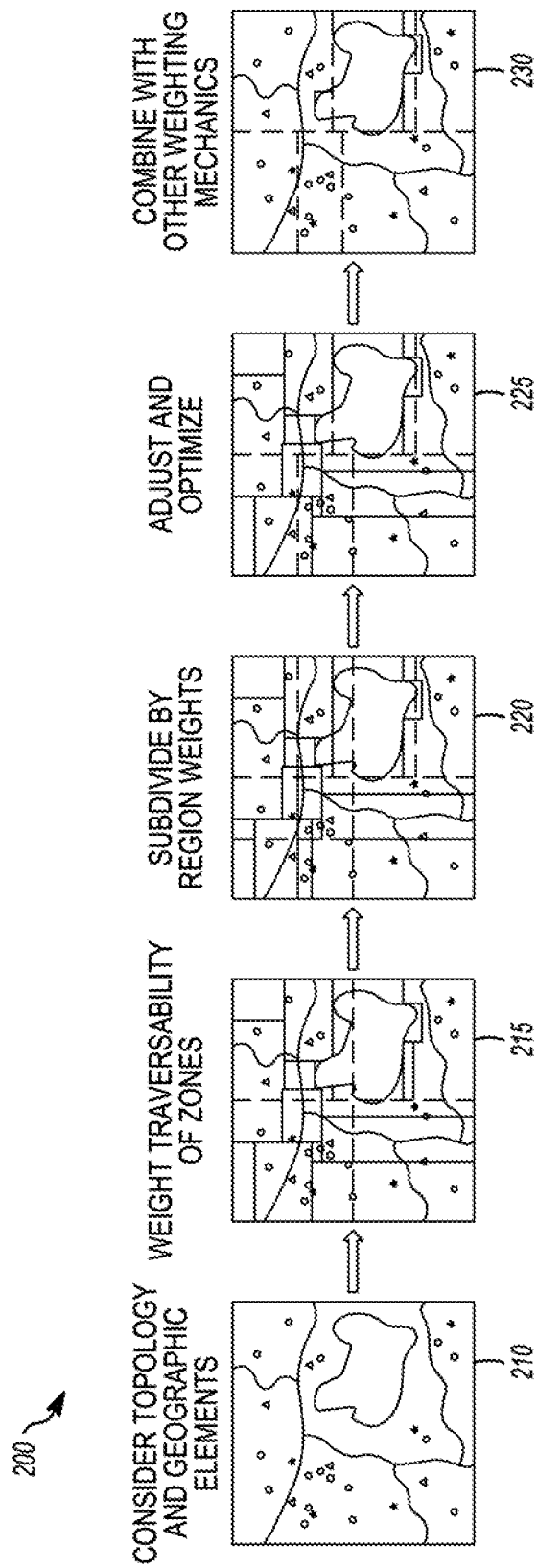
FIG. 2 depicts an illustrative example of weighting based on topological constraints, in accordance with a further embodiment.

In a further embodiment, geographic and topologic elements can be used to further improve the subdivision process. FIG. 2 depicts an illustrative example of weighting based on topological constraints, in accordance with a further embodiment. Features such as lakes, rivers, mountains, major roadways, minor roadways, and areas lacking major road networks, can be weighted and considered differently from, for example, suburban or downtown areas.

In the example of an embodiment depicted in FIG. 2, a method 200 is provided that can be implemented, for example, either after or in combination with other methods for subdividing the geographic area in which jobs are located, such as either or both of method 100 and method 150. Method 200 includes a step 210 of obtaining relevant topological and/or geographic elements within the geographic area, such as roads and bodies of water, for consideration.

In an embodiment, a method 200 includes a step 210 of associating relevant topological constraints for consideration, including topology and geographic elements and the like, with a geographic area that includes job locations. In FIG. 2's depiction of an example of step 210, for the depicted geographic area, topology and geographic elements such as major roadways, minor roadways, and bodies of water are depicted together with twenty-nine job locations, as previously shown by job count in the examples depicted for steps 110-130 of FIG. 1A, and by job weighting in the examples depicted for steps 150-170 of FIG. 1B. Like the example discussed above with regard to step 150, jobs having a previously determined weight of 1 are depicted in FIG. 2 by a solid circle, jobs having a previously determined weight of 2 are depicted by a triangle, jobs having a previously determined weight of 3 are depicted by a star, and jobs having a previously determined weight of 4 are depicted by a hollow hexagon.

In step 215, zones of the geographic area are weighted according to a metric of traversability. As used herein, the boundaries of zones ordinarily are different from the boundaries of the regions discussed with regard to FIGS. 1A and 1B, and the number of zones is not limited by the number of regions. In FIG. 2's depiction of an example of step 215, the geographic area is shown as divided in two ways: it is divided into four regions corresponding to the quadrants previously depicted (e.g., in steps 115 and step 155), shown here by dashed lines that divide the area into four quadrants of equal size, and it is also divided into a plurality of zones according to a weighting of traversability, which is shown in the example by a plurality of rectangular zones having irregular sizes, and each having a shading. A lighter shading represents an easier traversability, and a darker shading represents a more difficult traversability, relative to one another or relative to a predetermined actual or estimated or hypothesized norm, mean, or average of zones (for example, of all zones within the geographical area, or of all zones within some larger regional or national geographical area). In the depicted example, the darkest depicted shading corresponds to one or more rectangular zones that are mostly or entirely occupied by a portion of a body of water that has no bridge or other roadway to traverse the body of water, resulting in low traversability. In a further example, the lightest depicted shading corresponds to one or more rectangular zones that include major roadways that provide high traversability. In step 220, the four regions are subdivided based upon region weights. For example, each job location can be assigned a weighting based upon the zone of traversability in which the job is located. A weighting for each region (e.g., quadrant) can be determined, for example, from a weighting of the job locations within the region, e.g., by a total or an average of the traversability weights for the job locations within the region. In the depiction of an example of step 220, three of the four quadrants (the top left, top right, and lower right quadrants) are subdivided, each into two subdivisions of equal area, and the lower left quadrant is not subdivided. The top left and lower right quadrants are subdivided by a vertical dashed line, and the top right quadrant is subdivided by a horizontal dashed line. Based on weighting of traversability associated with job locations in each region—each job location, in the example depicted for step 220, having been previously job weighted in steps 150-170—the depicted subdivision of three of the regions was determined based upon existence of a weighting imbalance among all four regions, as discussed above with regard to steps 155 and 160. In step 225, if the regions remain imbalanced, further adjustment and optimization can be performed; for example, by further subdivision of regions, or by adjusting the position or shape of the previous subdivisions. In the example depicted for step 225, the top left region is adjusted to be subdivided along a horizontal line, rather than along the vertical line shown for step 220. In step 230, in some embodiments, the resulting weightings of jobs can then be further combined with other weighting mechanisms or methods, as discussed below.

Initial Assignments

Once the routing areas have been determined, with each routing area corresponding to one or more of the subdivisions that resulted from performing one or more of methods 100, 140, and/or 200, initial assignments can be chosen based upon, for example, technician start locations and the time windows of jobs within those routing areas.

Figure 3A:
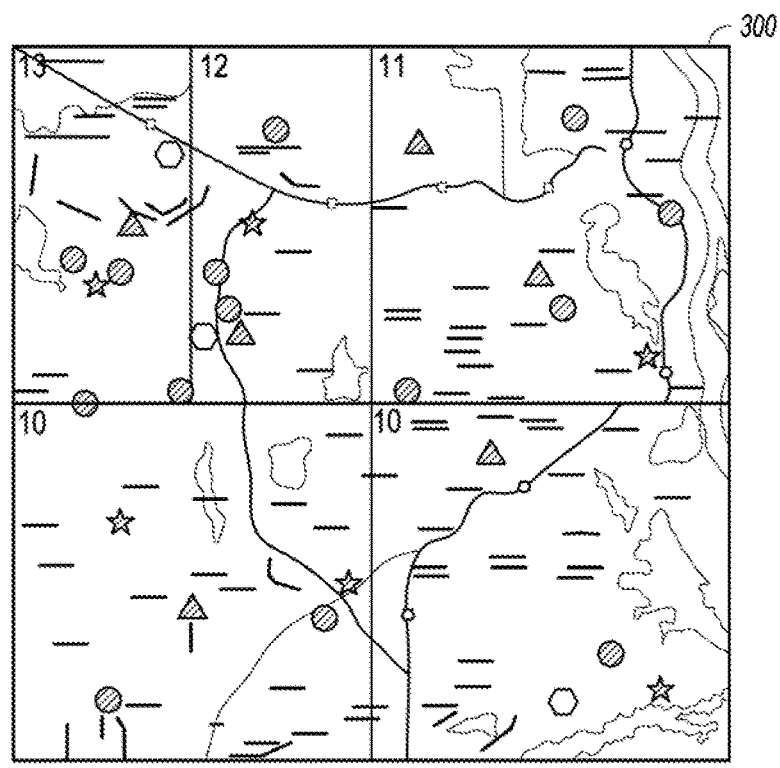
FIG. 3A depicts an example of a street map showing job locations and subdivisions, in accordance with an embodiment.
Figure 3B:
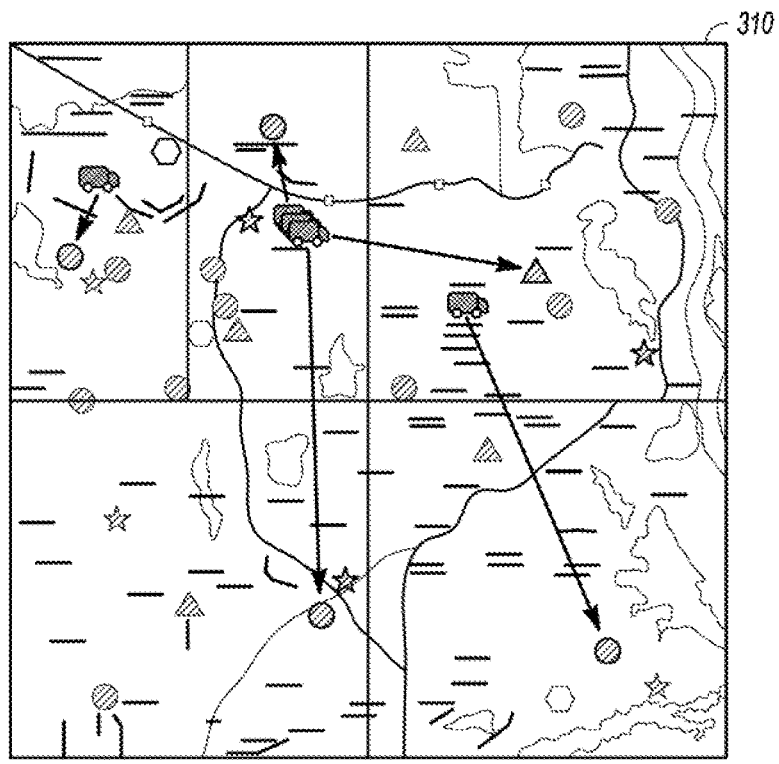
FIG. 3B depicts an example of a street map showing starting locations, each associated with an initial assignments in a different subdivision, in accordance with an embodiment.

FIGS. 3A and 3B together depict an illustrative example of initial assignments, in accordance with further embodiments. FIG. 3A depicts a street map showing job locations and subdivisions, in accordance with an embodiment. FIG. 3B depicts a street map showing starting locations, each associated with an initial assignments in a different subdivision, in accordance with an embodiment.

In FIG. 3A, by way of illustration, a map 300 depicts the job locations and the subdivisions resulting from previous steps, which are superimposed upon an example of a street map. In this example, map 300 shows the six rectangular subdivisions resulting from step 170, and as in the depiction of step 170, each of the six subdivisions has an associated numerical weighting (13, 12, 11, 10, and 10, respectively).

In FIG. 3B, a map 310 depicts starting locations for FSRs, in addition to the regions and job locations as shown on map 300. Each starting location is a geographic location from which an FSR will depart for an initial assignment to one of the job locations. In map 310, five starting locations are represented by icons, each depicting a stylized service truck. The starting locations differ from the twenty-nine job locations, and in this case, three of the five starting locations overlap geographically on the map 310, representing (in the illustrative example) a location where three service trucks may be parked or garaged together. One FSR will be assigned to each of the five regions. Each FSR will depart from one of the starting locations to an initial assignment in his or her respective assigned region, which may be in a region different from the region of the starting location.

Vertex Weight Calculations

In an embodiment, before a route can be assembled, a cost of transitioning between nodes must be determined. Transition weights are calculated using several different factors, including, for example, distance, estimated travel time, and historical data about travel within a particular area.

Figure 4:
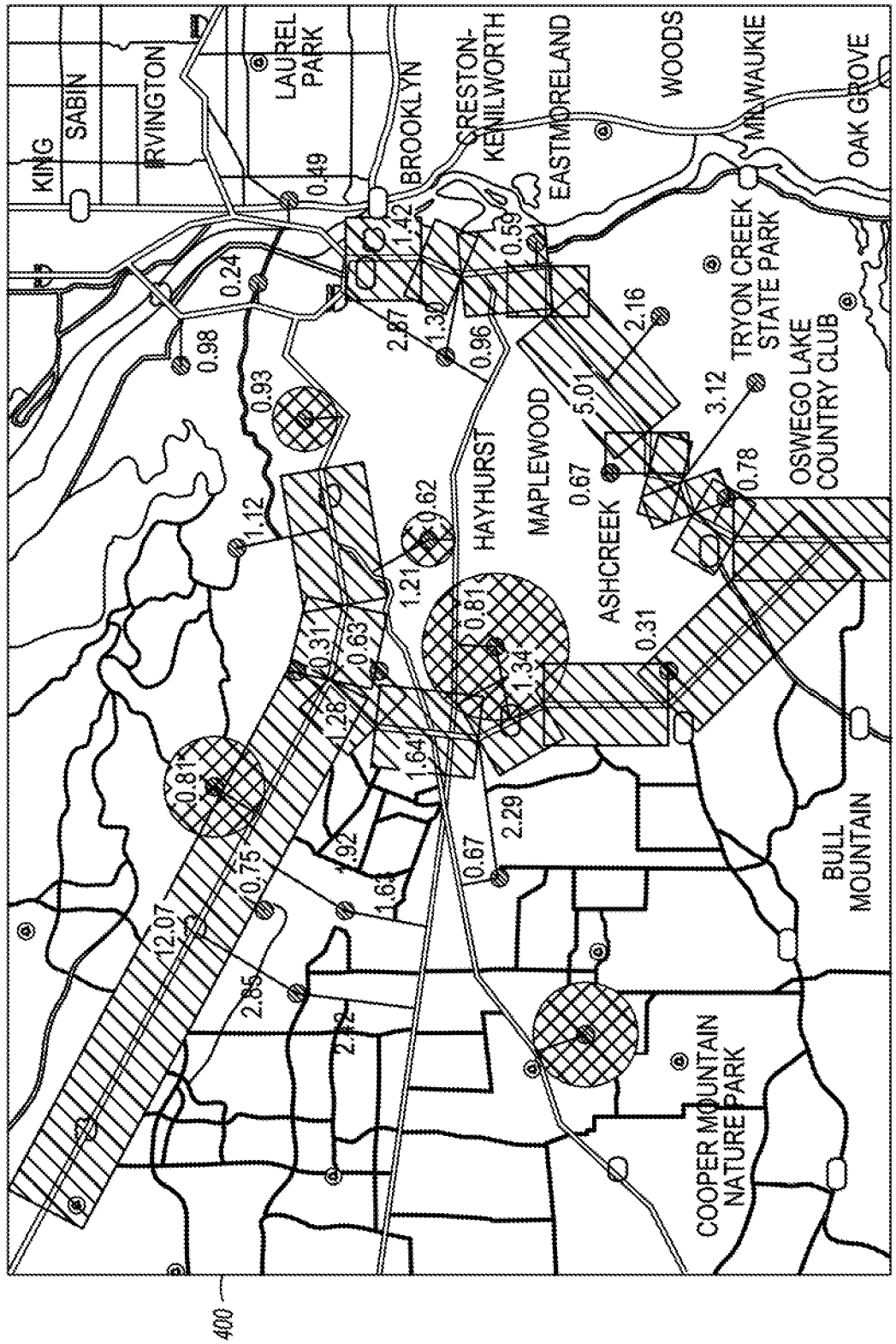
FIG. 4 depicts an example of a street map showing illustrative geographic contours and transition weights associated with job locations, in accordance with an embodiment.

FIG. 4 depicts an example of a street map showing illustrative geographic contours and transition weights associated with job locations, in accordance with an embodiment. As depicted in FIG. 4 by map 400, geographic contours for an area have been determined based upon the major road networks within that area. Using factors such as the distance from a major road, as well as costs of transitioning to that road, a cost weighting is determined for getting from each job location to another job location. Historical data is used, for example, in cases where node to node transitions have been calculated previously, either between locations directly, or between locations within a predetermined distance or radius surrounding either or both of the two locations. In some embodiments, two locations within a certain minimum distance of each other are considered to be the same location for the purpose of the initial weight estimations. Vertex weights can thus be assigned for connections between all nodes on the graph.

Initial Route Proposals

Conceived in the 1950s, Djikstra's graph search algorithm provides a shortest path solution for a digraph with non-negative path costs. It has popularly been used since that point to provide routing solutions. However, its efficiency is $O(V2)$ where V is the number of vertices in the graph (V>0), rendering it unsuitable for real-time routing scenarios. Some optimizations exist which can improve this result; however, conventional techniques have only reduced to $O(E+V \log V)$ where E is the number of edges, which is believed to provide insufficient performance for the desired DVRP system.

Ant Colony Optimizations provide an optimization based upon the behavior of real ants, which always find the shortest path between their nest and a food source, thanks to local message exchange via the deposition of pheromone trails. The ant colony optimization algorithm is a probabilistic technique that can be used to find very good, if not optimal, solutions to shortest path graph problems in finite time. The advantage of ACO based algorithms over traditional optimization algorithms is the ability to produce good solutions in very short periods of time.

The basic structure of the algorithm releases virtual ants along the edges of the graph from a given start point. Each virtual ant uses a formula to determine the probability of choosing a particular edge from any given vertex. As they traverse an edge, they deposit a virtual pheromone that weights the probability of future traversals towards that edge. As more ants travel more routes, weighting gravitates towards the edges with the most pheromone. Between travels the pheromone on each route is decayed. Since the most ants will be able to travel the shortest path more frequently, and hence deposit pheromone upon that shortest path more frequently, as time progresses the decay of lesser used paths eventually leads to a point where the weighting of pheromone in the formula causes all ants to take only the shortest path. It is difficult to predict the exact point of convergence (time at which a global optimum solution is found), however it is possible to time-box the search and settle upon the best route found up to that point in time, thereby tuning the algorithm to trade-off between overall global route accuracy and desired search time.

Visualizing the ACO Process

The ant colony optimization simulates the real-world process employed by ants when searching for food. The algorithm uses probability and weighted heuristics to plot the tours of virtual ants through the graph and determine a strong solution. The resulting graph represents a road network, with edges representing roads, while vertices represent the intersections of those roads.

Figure 5A:
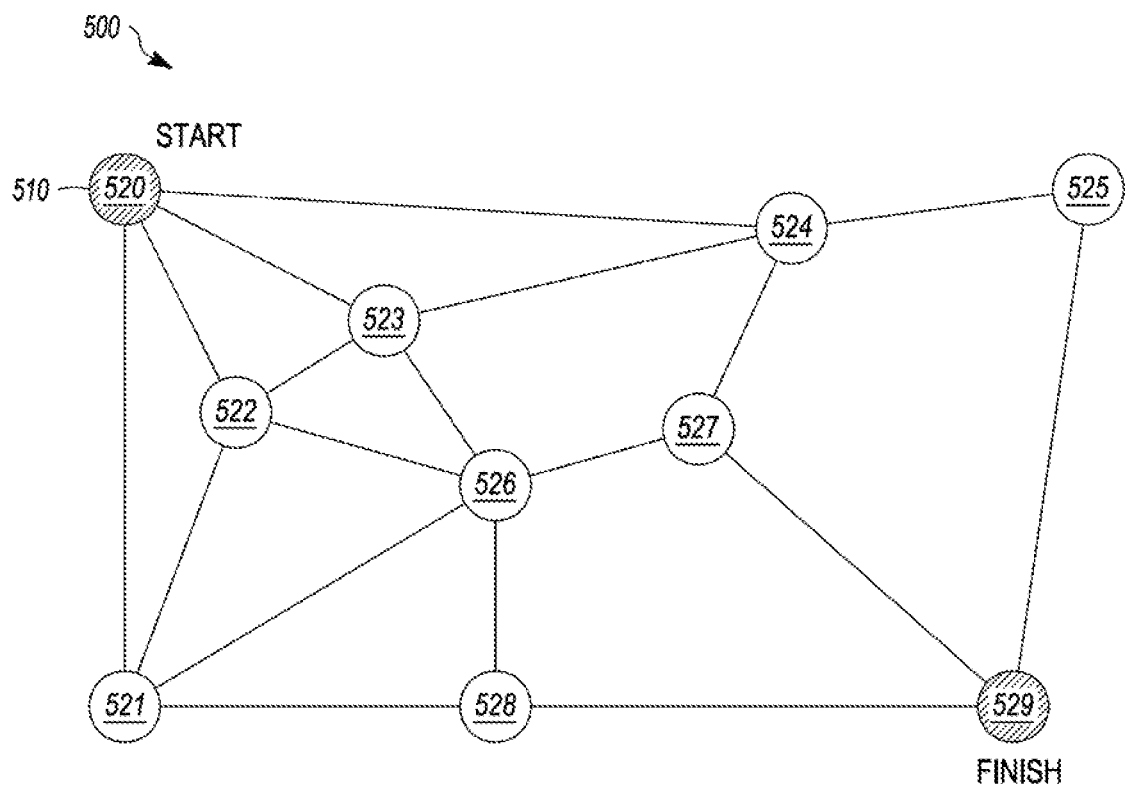
FIG. 5A depicts an example of a graph of vertices and edges representing possible paths between a start location and a finish location, in accordance with an embodiment.

FIG. 5A depicts an example of a graph 500 of vertices 520-529 and edges representing possible paths between a start location 510 and a finish location 529, in accordance with an embodiment.

Figure 5B:
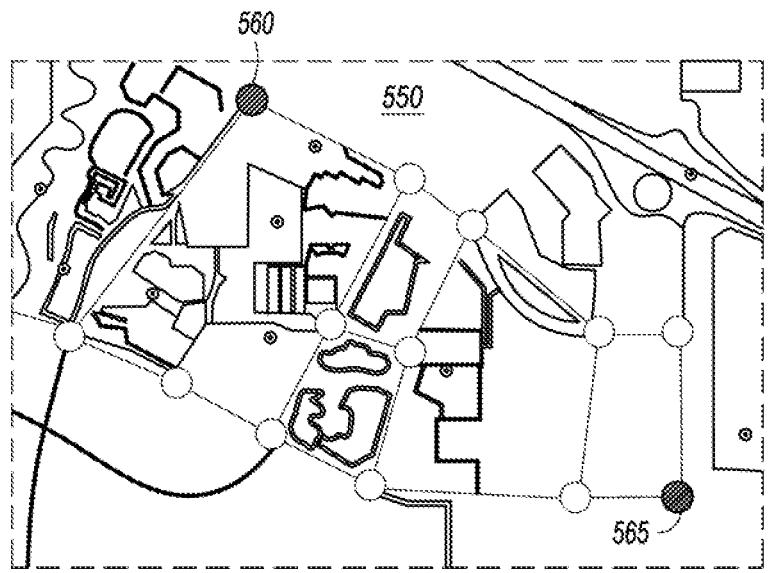
FIG. 5B depicts an example of a street map that includes a graph of vertices and edges representing possible paths between a start location and a finish location, in accordance with an embodiment.

FIG. 5B depicts an example of a street map 550 that includes a graph of vertices and edges representing possible paths between a start location 560 and a finish location 565, in accordance with an embodiment.

Figure 6A:
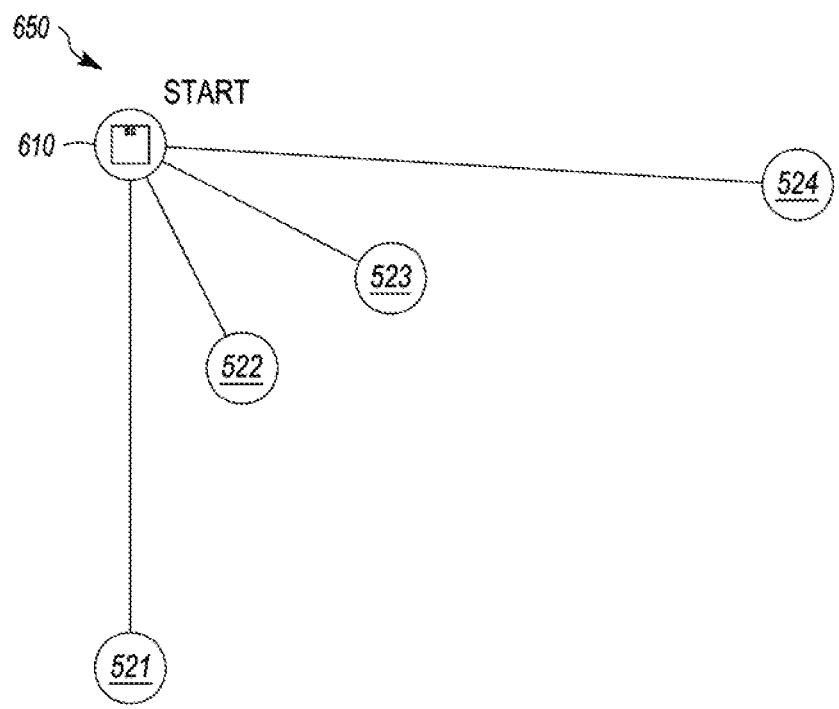
FIG. 6A depicts an example of a partial graph representing an initial portion of FIG. 5A, in accordance with an embodiment.

FIG. 6A depicts an example of a partial graph 600 representing an initial portion of graph 500, in an embodiment. In accordance with an implementation of an ACO method in an embodiment, a virtual ant is spawned at the start location 610, corresponding to vertex 520 in FIG. 5A. The virtual ant considers each of the four paths before it and based upon the attractiveness of each node, a choice is made. The attractiveness can be affected by a variety of control parameters, including such heuristics as the desirability of a particular edge (road) under different conditions such as traffic or imposed speed limits.

Figure 6B:
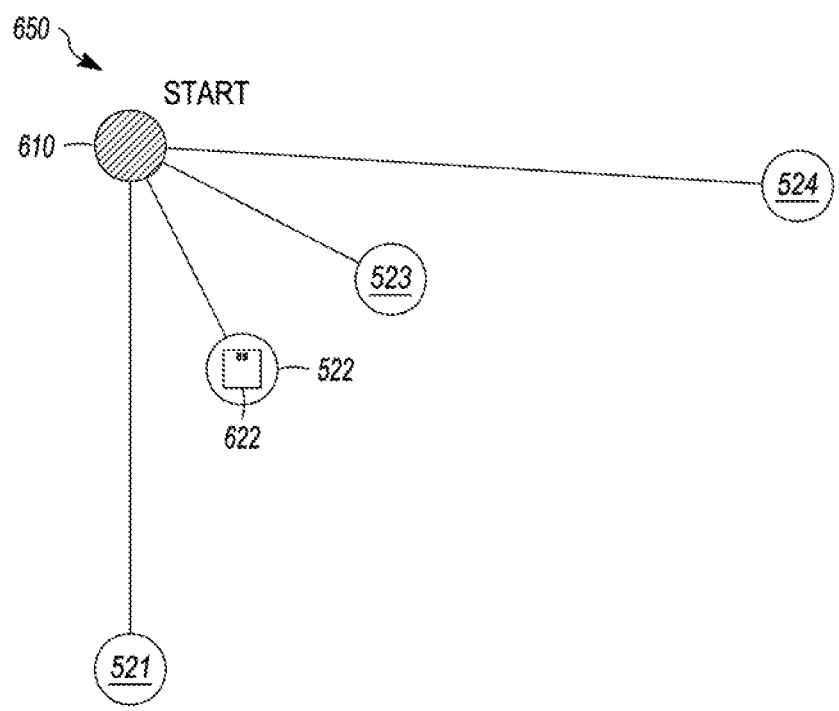
FIG. 6B depicts an example of a partial graph in which a virtual ant has moved from a start location to a selected vertex, in accordance with an embodiment.

FIG. 6B depicts an example of a partial graph 650 in which the virtual ant has moved from start location 610 to a selected vertex 622, corresponding to vertex 522 in FIGS. 5A and 6A.

The probability that the ant will take a particular path can be calculated as follows:

$$p_{xy}^k = \frac{(T_{xy}^\alpha)(D_{xy}^\beta)}{\sum_{y \in a_y} (T_{xy}^\alpha)(D_{xy}^\beta)}$$

$T_{xy}$ is the amount of pheromone deposited for transition from x to y $D_{xy}$ is the desirability of state transition xy (typically $$\frac{1}{d_{xy}}$$

where d is the distance between x and y)

α and β are parameters to control the influence of $T_{xy}$ and $D_{xy}$, respectively. (α≥0, β≥1)

$a_y$ represents the set of allowed transitions.

Using the foregoing formula, the relative probabilities for each path are assigned and a choice is made. In a simulation, according to an embodiment, the virtual ant transitions from one node to another. The virtual ant deposits virtual pheromone along each of the edges it travels. This pheromone changes the attractiveness of those edges, affecting the decision making of subsequent virtual ants.

Figure 7:
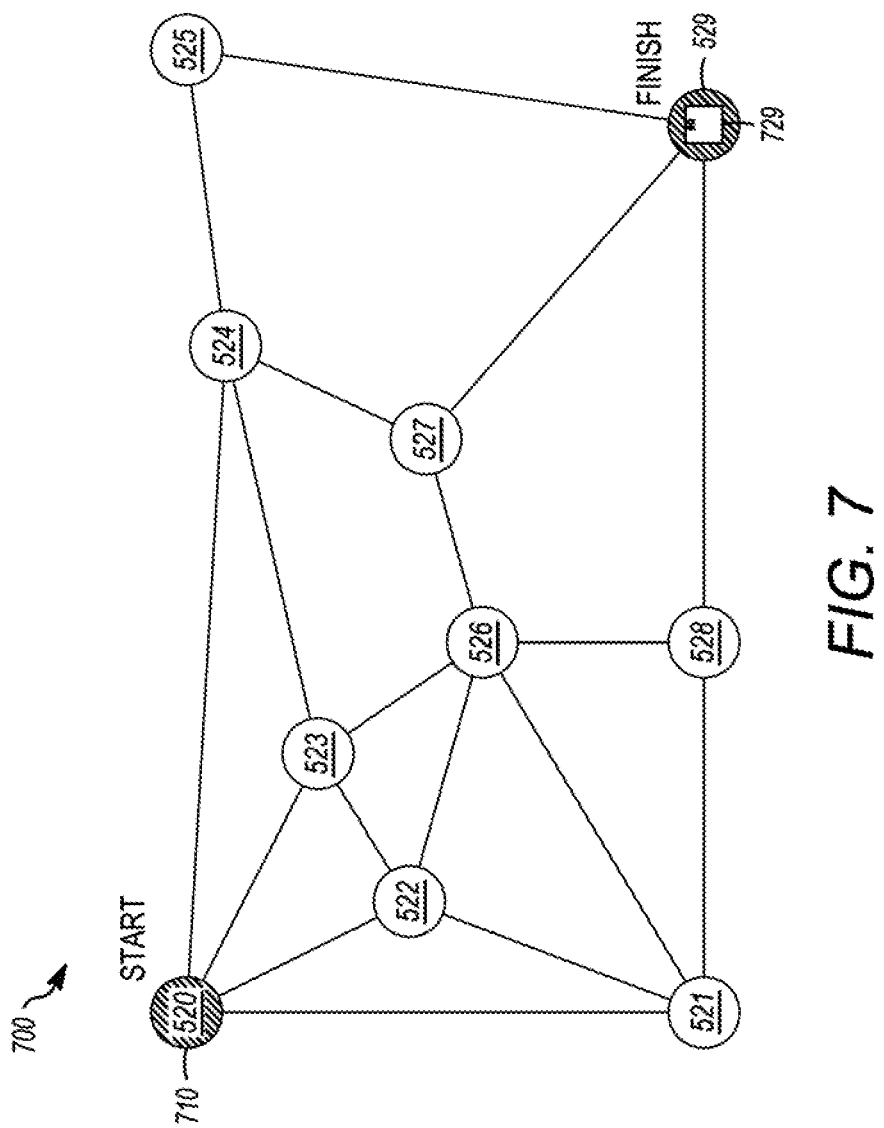
FIG. 7 depicts an example of a graph of vertices and edges in which a virtual ant has reached a finish location, in accordance with an embodiment.

FIG. 7 depicts an example of a graph 700 of vertices and edges in which a virtual ant has reached a finish location 729, in accordance with an embodiment. From the start location 710, the virtual ant continues its tour until it reaches the finish location 729 (corresponding to vertex 529), depositing pheromone along all edges visited on the tour. In the simulation, the ant tracks the total distance traveled as it follows the path.

In an embodiment, when all virtual ants in the simulation have completed a solution, the trails are decayed. In an illustrative example, trails are decayed in an embodiment according to the following formula:

$$T_{xy} \leftarrow (1-\rho)T_{xy} + \Sigma_k \Delta T_{xy}^k$$

$T_{xy}$ is the amount of pheromone deposited for a state transition xy

ρ is the pheromone evaporation coefficient $\Delta T_{xy}^k$ Is the amount of pheromone deposited by the $k^{th}$ ant:

$$\frac{Q}{L_k}$$

if xy is used in the tour, 0 otherwise.

$L_k$ is the length of the ant's tour

Q is a constant used to control pheromone decay

Figure 8:
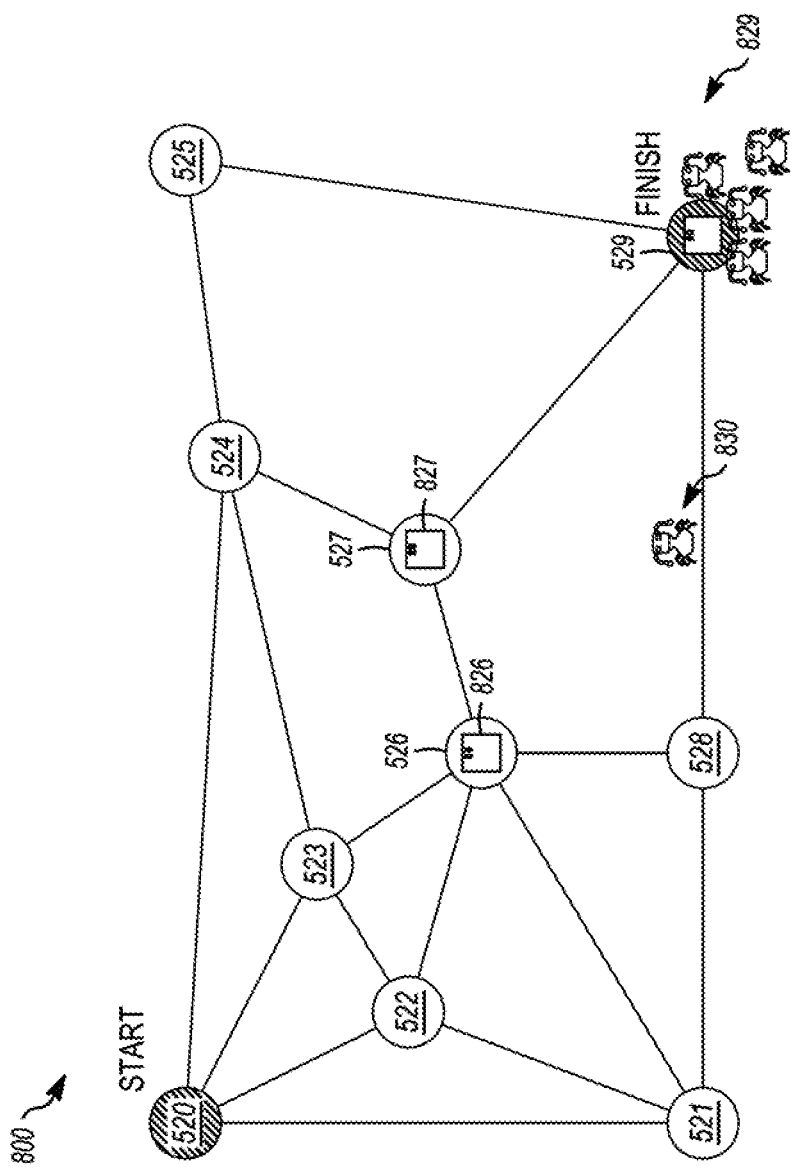
FIG. 8 depicts an example of a graph of vertices and edges in which a plurality of virtual ants are touring in a simulation, in accordance with an embodiment.

FIG. 8 depicts an example of a graph 800 of vertices 520-529 and edges in which a plurality of virtual ants are touring in a simulation, in accordance with an embodiment. As depicted, some virtual ants will reach a finish location 829 (corresponding to vertex 529), while other virtual ants have not yet reached the finish location 829. In the illustrative example shown in FIG. 8, ant 830, (shown on a path from vertex 528 to vertex 529), ant 826 at vertex 526, and ant 827 at vertex 527, have not yet reached the finish location 829.

After several more tours and decay cycles, the strongest (shortest) path will become saturated with virtual pheromones while others fade away completely.

Figure 9:
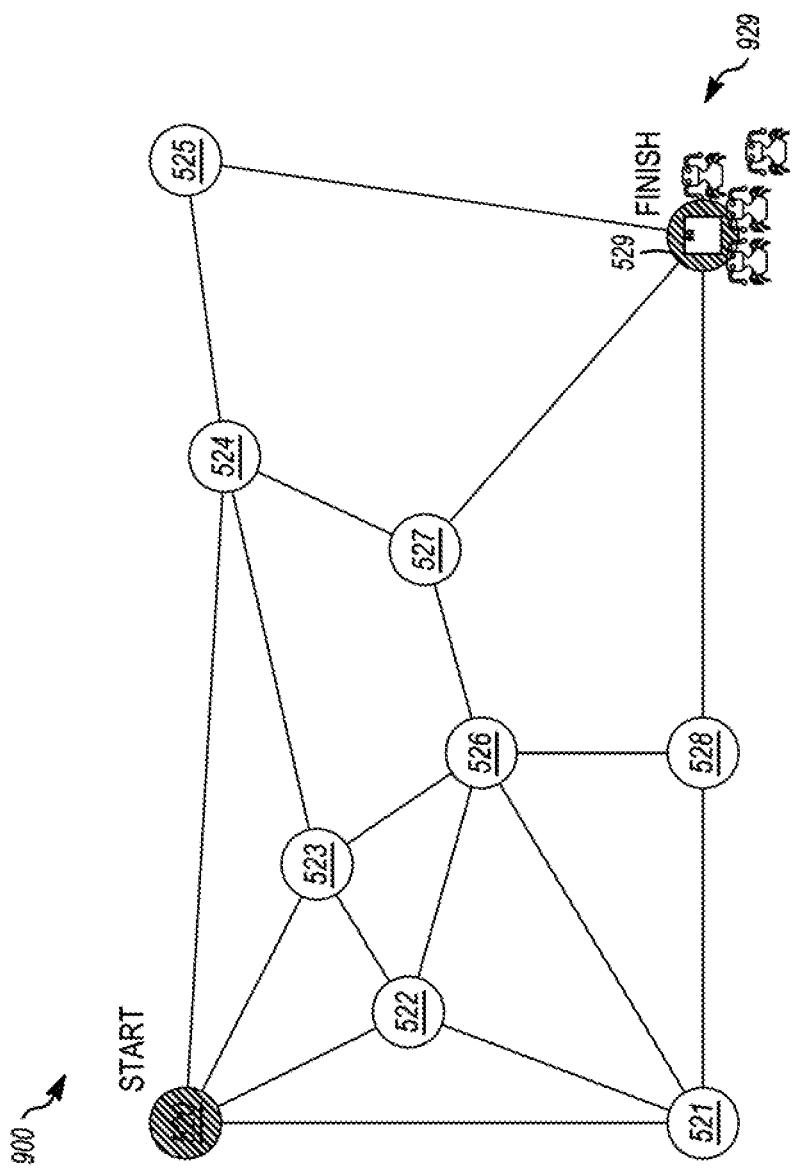
FIG. 9 depicts an example of a graph of vertices and edges in which a plurality of virtual ants in a simulation have determined a shortest path from a starting location to a finish location, in accordance with an embodiment.

FIG. 9 depicts an example of a graph 900 of vertices 520-529 and edges in which a plurality of virtual ants have determined a shortest path from a starting location 520 to a finish location 929, in accordance with an embodiment. In an embodiment, a critical threshold is reached where sufficient pheromone exists on the shortest path to eliminate the probability of selecting other paths, which indicates that a good or optimal solution has been found. In the illustrative example shown in FIG. 9, the shortest path is indicated by thick lines that highlight the path from vertex 520 to vertex 522 to vertex 526 to vertex 527 to vertex 529 (corresponding to the finish location 929).

Applying ACO to a Problem with Multiple Destinations

In a further embodiment, while ACO can be applied to the Shortest Path Problem, it also has applications in a variant involving multiple destinations, where the ants must not only find the shortest path between two nodes, but must also ensure that several nodes in an area are each visited at least once. This transforms the problem by considering multiple nodes as a complete route, rather than a single path between two nodes. Similar principles are followed, but with additional goals, such as one or more of the following illustrative goals:

The ants must visit each job node exactly once

Distant job nodes have a lower probability of being chosen

Pheromone strength on a route increases the probability that route will be chosen Pheromone is deposited upon traveled routes if the total journey is short The pheromone upon traveled routes is decayed after each iteration In an embodiment, over time a good tour is developed that visits each job node exactly once, while covering a short distance. The Shortest Path Problem solution discussed above with reference to FIG. 5A through FIG. 9, can be used to determine more exact routing information after the overall route has been discovered. In this way, in an embodiment, the full tour is determined at a macro level whilst the exact street routing is determined between nodes on a finalized solution.

Figure 10:
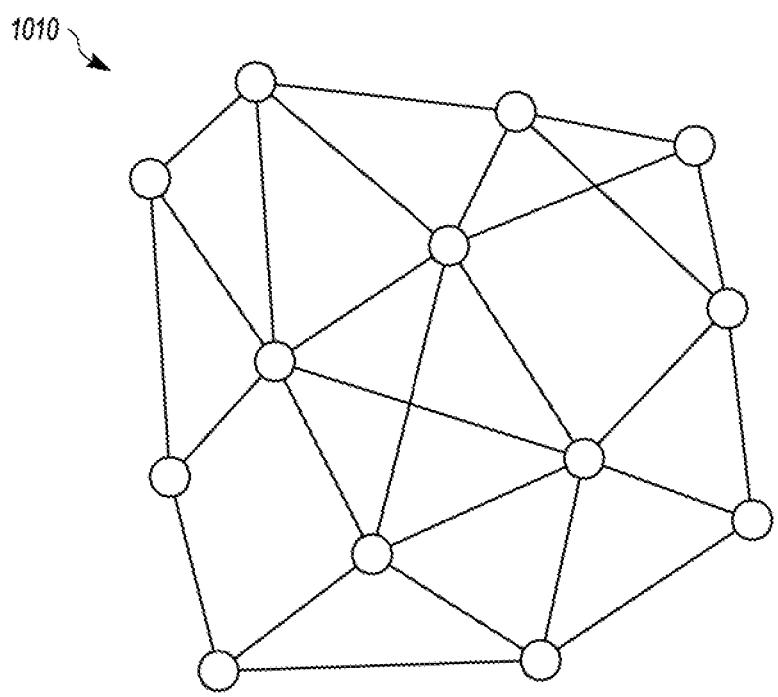
FIG. 10 depicts an example of a graph of vertices and edges for a simulation where virtual ants must ensure that one or more of the vertices are each visited at least once, in accordance with an embodiment.

FIG. 10 depicts an example of a graph 1010 of vertices and edges for a simulation where virtual ants must ensure that one or more of the vertices are each visited at least once, in accordance with an embodiment.

Figure 11:
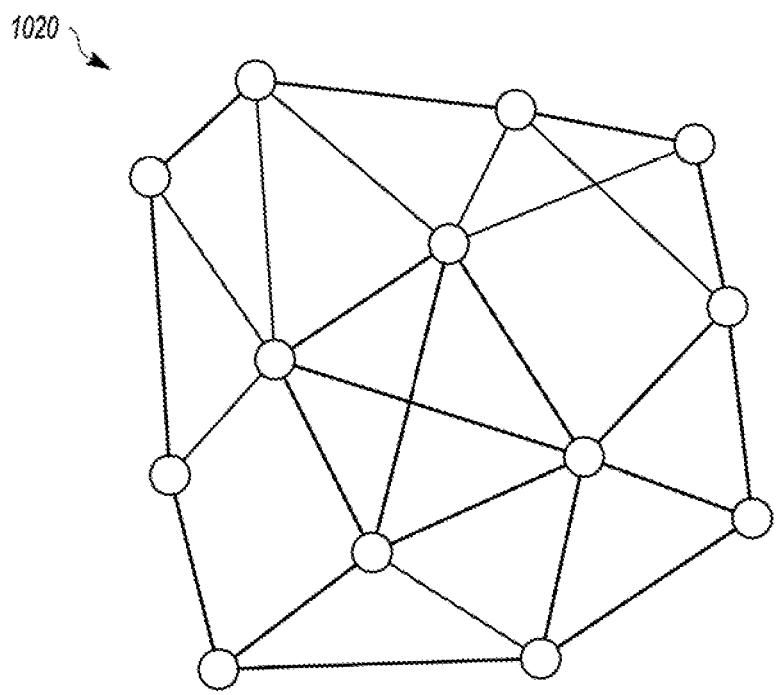
FIG. 11 depicts an example of a graph of vertices and edges, representing a first tour in which each vertex is visited at least once, in accordance with an embodiment.

FIG. 11 depicts an example of a graph 1020 of vertices and edges, representing a first tour in which each vertex is visited at least once, in accordance with an embodiment.

Figure 12:
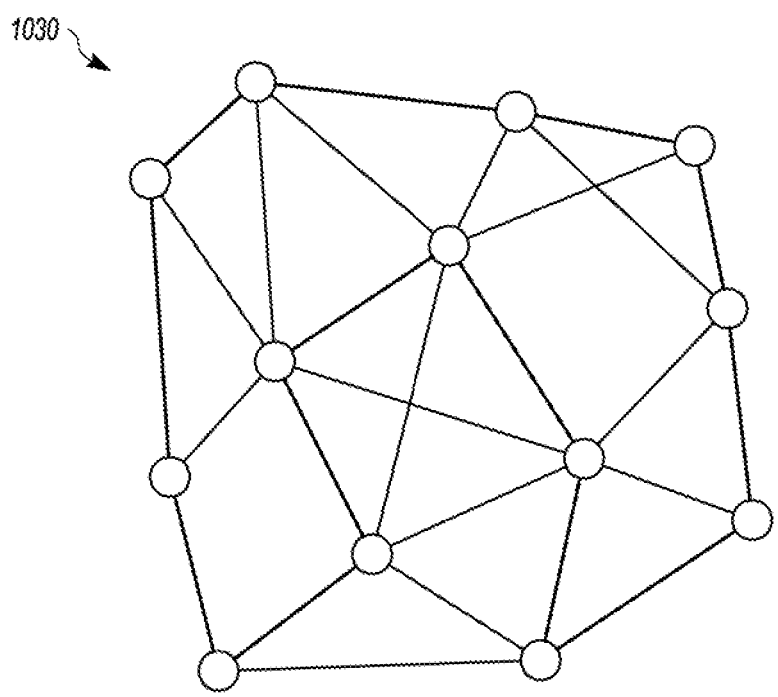
FIG. 12 depicts an example of a graph of vertices and edges, representing a second tour in which each vertex is visited at least once, in accordance with an embodiment.

FIG. 12 depicts an example of a graph 1030 of vertices and edges, representing a second tour in which each vertex is visited at least once, in accordance with an embodiment.

Dynamic Vehicle Routing Problems with Time Windows (DVRPTW)

In a further embodiment, additional components of the problem relate to time windows and technician proficiencies. Not all nodes can be visited at all times of day, nor can they be serviced by all technicians. This means that certain nodes are illegal during the tour unless certain conditions are met. The ants prioritize nodes by the introduction of control parameters to the formulas for probability of node or route selection. A more distant (less visible) node may become more attractive because it fulfills time window and proficiency criteria that nearby nodes do not. Nodes are weighted differently depending upon what time in the tour they are considered. The more distant node best matches current criteria and is therefore selected.

Figure 13:
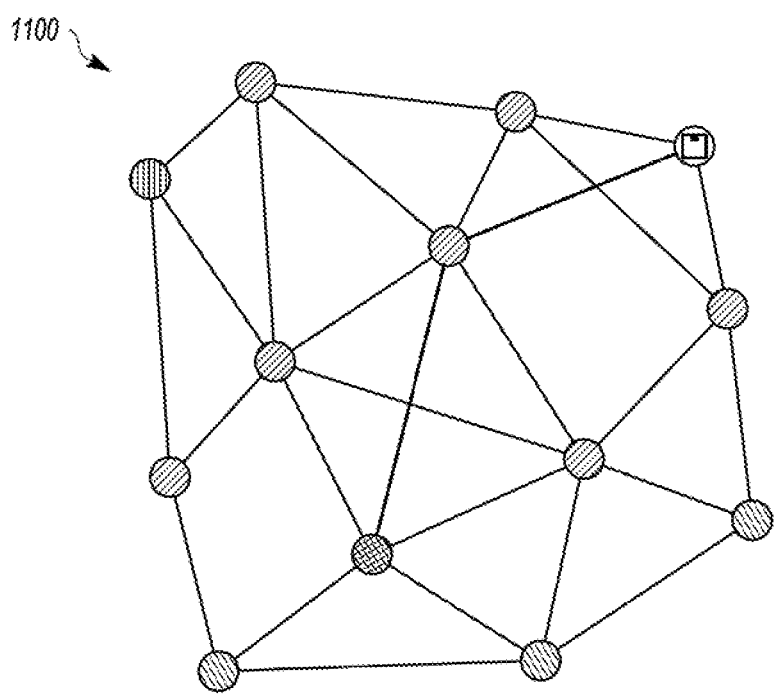
FIG. 13 depicts an example of a graph of vertices and edges, representing a tour in which the most distant node from a starting node is selected, in accordance with an embodiment.

FIG. 13 depicts an example of a graph 1100 of vertices and edges, representing a tour in which the most distant node from a starting node is selected, in accordance with an embodiment. The tour is represented by a thick line from a starting location represented by a hollow circle, through one intermediate vertex, to a finish location represented by a circle containing a virtual ant.

Route Shape Validation (Hull Testing)

In a further embodiment, once a route has been determined, the shape of the route is validated. This is to avoid routes that are excessively concave, convex, or linear in nature; where a technician ends their route a considerable distance from the start point or performs excessive wasteful transitions. The polygon described by the route forms a testable hull that can be used to quickly seek opportunities for optimization. Convex hulls with strong contour matches are considered to be strong routes, whereas alien, heavily concave hulls and those deviating from known contours are prioritized for optimization.

Figure 14:
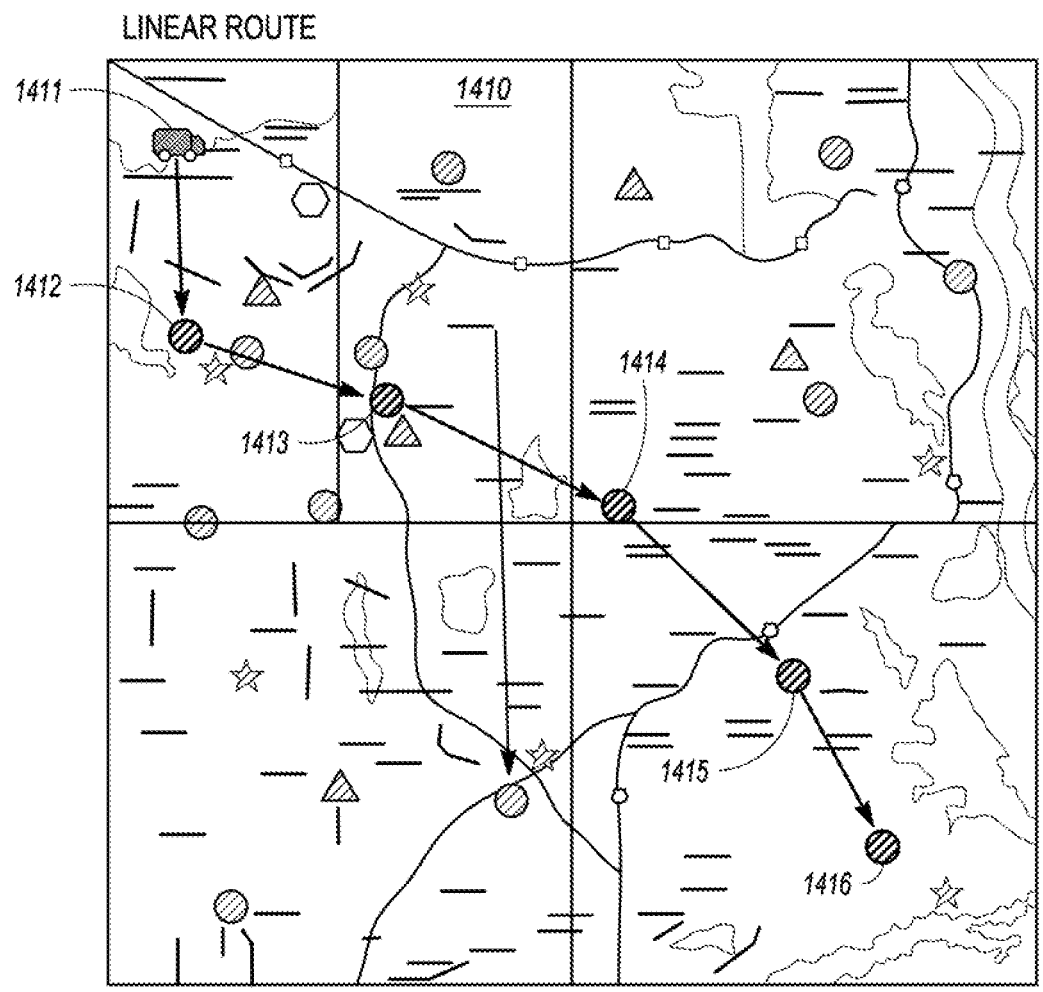
FIG. 14 depicts an example of a linear route in a map showing a linear route from a starting location through job locations to a finish location, in accordance with an embodiment.

FIG. 14 depicts an example of a linear route in a map 1410 showing a linear route from a starting location 1411 through job locations 1412-1415 to a finish location 1416, in accordance with an embodiment.

Figure 15:
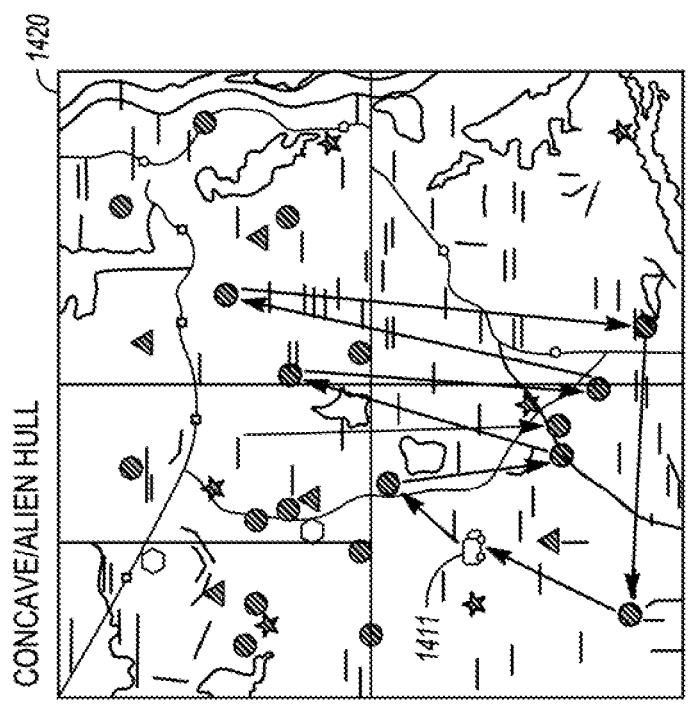
FIG. 15 depicts an example of a concave hull route, in a map showing a route from a starting location through a plurality of job locations and back to the start location, in accordance with an embodiment.

FIG. 15 depicts an example of a concave hull route, also known as an alien hull, in a map 1420 showing a route from a starting location 1411 through a plurality of job locations and back to the start location 1411, in accordance with an embodiment.

Figure 16:
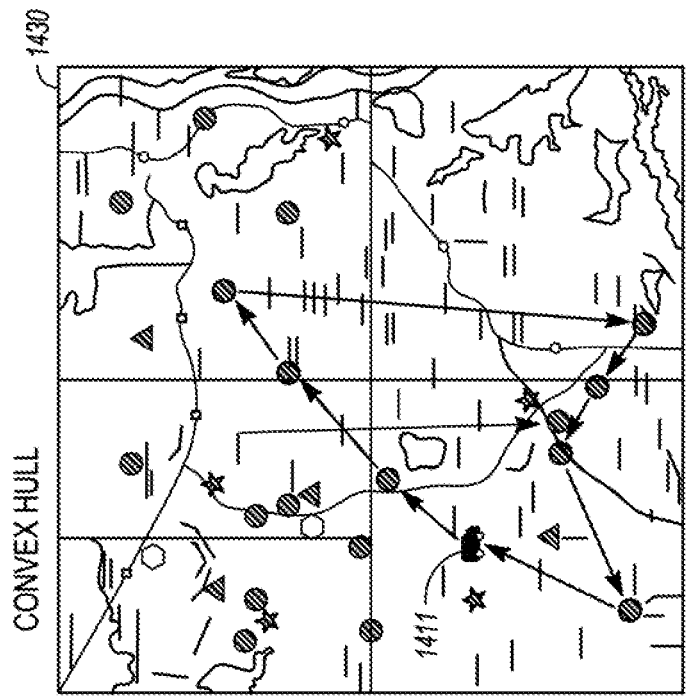
FIG. 16 depicts an example of a convex hull route, in a map showing a route from a starting location through the plurality of job locations and back to the start location, in accordance with an embodiment.

FIG. 16 depicts an example of a convex hull route, in a map 1430 showing a route from a starting location 1411 through the plurality of job locations and back to the start location 1411, in accordance with an embodiment.

Neighbor Optimizations (Regional Trades)

In a further embodiment, one of the drawbacks of routing areas is the elimination of potential route optimizations between neighboring areas. Regional trades are employed after the initial routes are proposed to look for optimizations between neighboring areas. The routing engine considers the relative benefits of each trade and will exercise those with benefits above a predetermined threshold. The threshold values are determined from the control parameters provided as part of the business rules for the engine. Hull weightings, relative tour weights, and overall regional balancing weights are used to determine routes and areas most in need of optimization.

Figure 17:
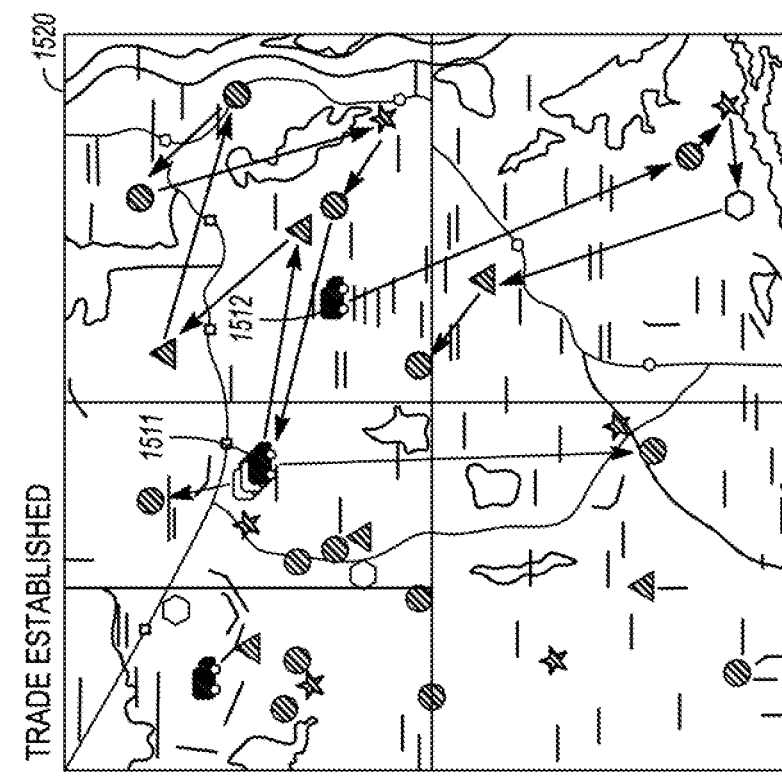
FIG. 17 depicts a map showing an example of identification of a suboptimal route, in accordance with an embodiment.

FIG. 17 depicts a map 1510 showing an example of identification of a suboptimal route from a starting location 1511 through a plurality of job locations and back to the starting location 1511, in accordance with an embodiment.

Figure 18:
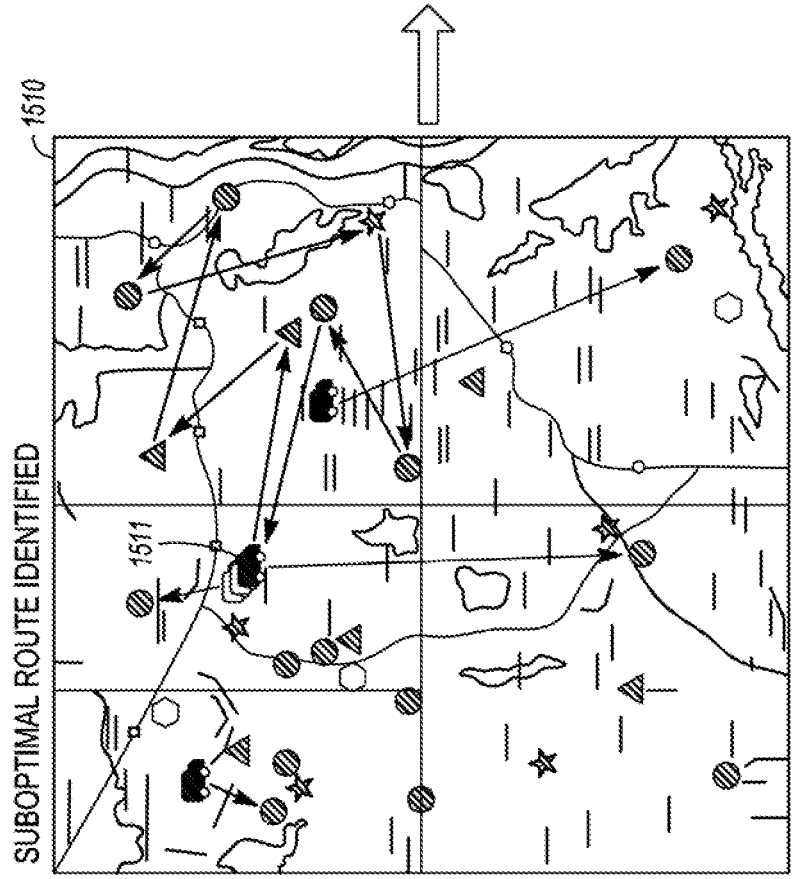
FIG. 18 depicts a map showing an example of establishing a trade to remedy the identified suboptimal route, in accordance with an embodiment.

FIG. 18 depicts a map 1520 showing an example of establishing a trade to remedy the identified suboptimal route, in accordance with an embodiment. A first FSR begins a route from a starting location 1511 through a plurality of job locations and back to the starting location 1511, and a second FSR begins a route from a starting location 1512 through a plurality of job locations and back to the starting location 1512. Relative to the map 1510, the second FSR and the first FSR have traded one of the intermediate job locations previously assigned to the first FSR, resulting in a more optimal route for the first FSR.

Route Weight Validation

In an embodiment, once initial routes have been determined and optimizations have been applied, the overall routes are validated using fine-grain street level data. This validation step looks for routes that pass the estimation phase but are still in need of changes. Course-grain contours are used for the majority of the process and it is only after the routes have been built that a service, such as OSM or Google Maps, can be employed to validate route viability at the street-level.

Figure 19:
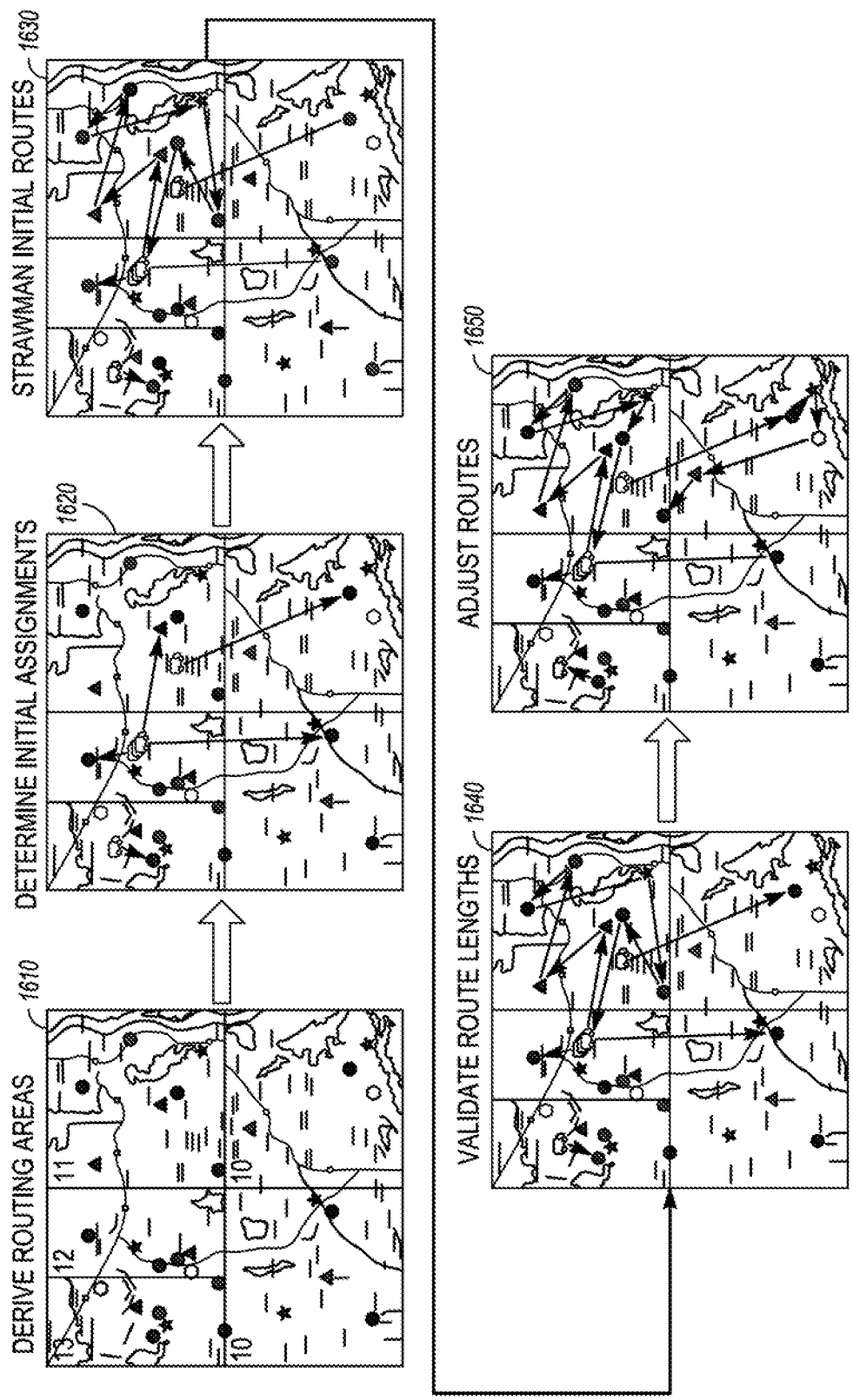
FIG. 19 depicts route weight validation, in accordance with an embodiment.

FIG. 19 depicts route weight validation, in accordance with an embodiment. A method for route validation for a routing pipeline is provided. In step 1610, routing areas are derived. In step 1620, initial assignments are determined. In step 1630, strawman initial routes are determined. In step 1640, route lengths are validated. In step 1650, the routes are adjusted.

In an embodiment, heuristic optimizations may then be applied. Following validation of technician routes, the continual process of heuristic optimization can begin. This process monitors the progression of technicians throughout the working day looking for potential problems as well as potential improvements that can be made. The engine will calculate the weight of the benefits and drawbacks of any potential change. If that change fits within predetermined thresholds then the optimization can be applied. This tactical set of changes aims to bring the largest benefits while introducing the least number of route updates. By updating route nodes individually, the overall stability of the route is maintained while still reacting to jobs that overrun or underrun respectively.

Workforce Management Dashboard

In an embodiment, many of the steps taken by the routing engine are performed in the background by one or more computer processors (e.g., in one or more servers), and do not rely upon direct human input. However, in order for those steps to be audited they must be visualized. In an embodiment, a workforce management dashboard provides an interface for a dispatcher or supervisor to review, audit, and monitor the state of the enterprise.

Figure 20:
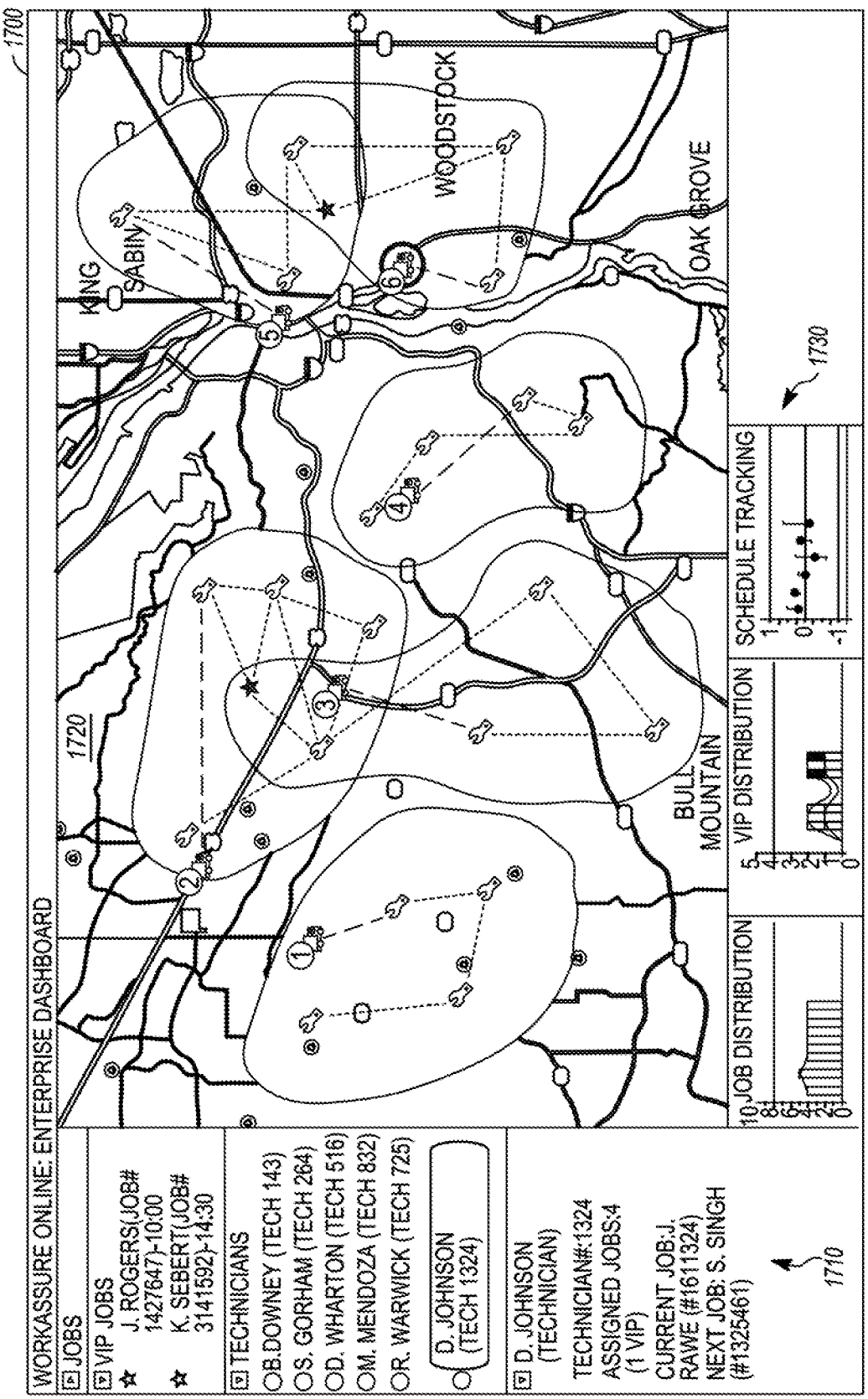
FIG. 20 depicts an illustrative example of a workforce management dashboard, in accordance with an embodiment.

FIG. 20 depicts an illustrative example of a workforce management dashboard 1700, in accordance with an embodiment. The dashboard 1700, for example, can include user interface components such as a panel 1710 for providing text such as job and technician information, a map panel 1720, and a graphical panel 1730 for providing one or more graphs (which may be updated in substantially real time) showing information such as job distribution, VIP distribution, and schedule tracking.

In an embodiment, the dashboard 1700 provides a combined interface for route tracking, scenario simulation, auditing, and visualizing decisions. The illustration in FIG. 20 is an illustrative example of such a dashboard in one particular configuration.

One of the concepts that can be assisted by use of dashboard 1700 is overbooking. In order to mitigate the risk of missing appointments, some jobs are intentionally overbooked by assigning the job to more than one technician's route. In this way, neither technician is guaranteed to service the appointment, but at least one of them is expected to eventually service the appointment. Should one of the technicians fall behind on their schedule, the overbooking is reconciled to the technician most likely to service the appointment. This is reflected in the technician's schedule using specific visualizations for confirmed vs. planned jobs on the route. Jobs further into the future are less stable and more likely to change throughout the day. By providing this prediction ahead of time, technicians can see their potential routes both before and after mitigation.

Control Parameter Specification

In a further embodiment, business process control parameters are configured via a dashboard 1800 that can be used, e.g., by system administrators to configure and control the routing engine.

Figure 21:
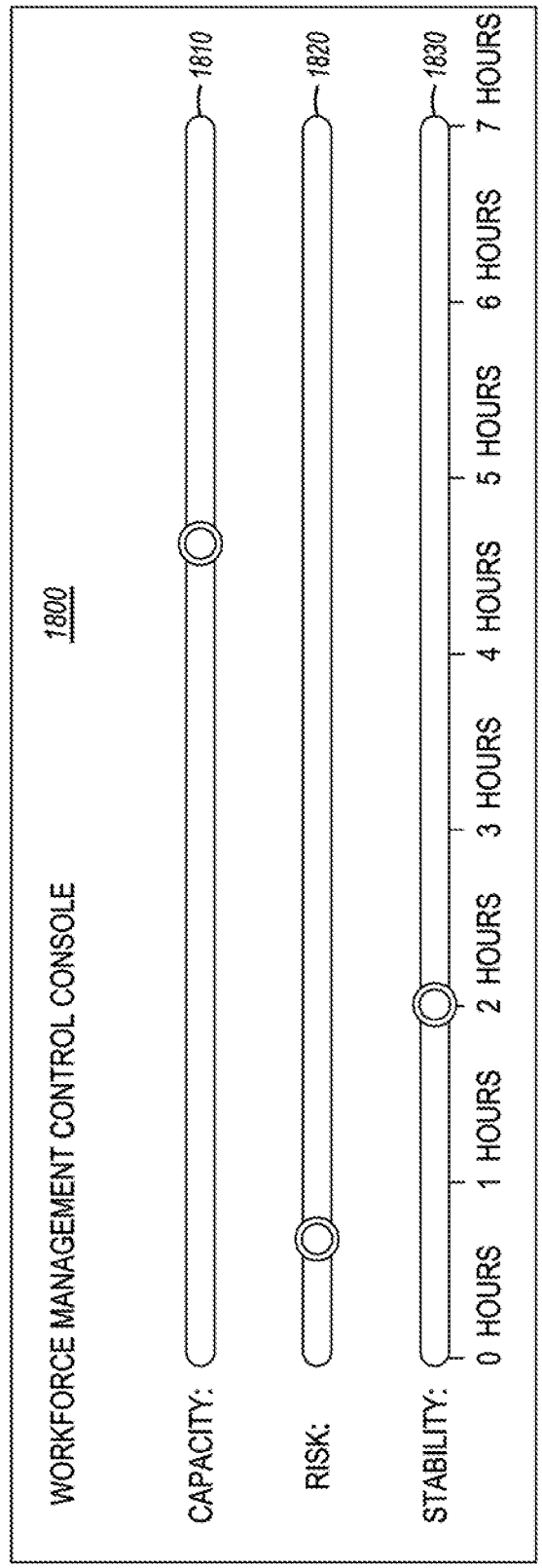
FIG. 21 depicts an example of a dashboard for controlling a workforce management system, in accordance with an embodiment.

FIG. 21 depicts an example of a dashboard 1800 for controlling a workforce management system, in accordance with an embodiment. In the dashboard 1800 pictured in FIG. 21, the most important data inputs are presented as linked sliders that together represent appetites for capacity 1810, risk 1820, and stability 1830.

In the context of the control console, capacity (as an input) is seen as the desire to overbook jobs. More technician capacity means a higher chance that all jobs will be serviced, and therefore less risk. Conversely, a higher appetite for risk means more efficient use of fewer technicians. Finally, stability is the desire for a portion of a technician's schedule to remain unchanged. In the example above, the control console is set to keep the next two hours of a technician's schedule stable. The routing engine will use this value when determining optimizations and event-based swaps, potentially picking a less optimal route but respecting the request for stability. This provides control over the trade-off of stability vs. optimization.

Calculated Outputs: Adjusting any one slider automatically affects the values of the other sliders. For example, expanding the window of stability will increase risk as a large stability value, such as 6 hours, gives very little flexibility for the routing engine to find solutions with existing technicians. Lowering risk will automatically suggest increases in capacity and reductions in the length of the stability window.

In further embodiments, certain minimum values are required. For example, a minimum capacity is required to cover the jobs in a given area. A minimum risk is always needed as unexpected events always introduce a certain level of risk.

Event-Based Adjustments: Just as a human dispatcher responds to events such as canceled appointments, technicians stuck in traffic, and jobs that overrun, the routing engine can follow a predetermined business process to adapt and respond to those events. The artificial intelligence engine can uses answers to business model questions to determine the correct course of action to take for a set of pre-determined events.

Slack-Time Adjustments: When a job is canceled, a technician can end up with slack time in their schedule as their next job likely does not start right away. If the slack time is large enough, as determined by business control parameters, the routing engine will look for a job to fill the time and adjust the subsequent items in the schedule accordingly.

Jeopardy Prediction and Mitigation: Similarly, when a technician is running behind schedule, the engine can detect jobs that will be in jeopardy and being to rearrange routes accordingly.

Time-Boxed Execution and Convergence: In any probabilistic model, there is almost always room for further optimization and improvement. A trade-off for efficiency is to limit the amount of time spent seeking optimizations, instead looking for a solution that is "good enough."

While the principles of the invention have been described above in connection with specific devices, apparatus, systems, and/or methods, it is to be clearly understood that this description is made only by way of example and not as limitation. Particular embodiments, for example, may be implemented in a non-transitory computer-readable storage medium for use by or in connection with an instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented, and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A street-level routing device comprising:
a routing engine operably connected to a memory storing a map of a geospatial region having a plurality of job locations, each job location associated with at least one job, the routing engine having a processor configured to:
divide the map into a plurality of sections balanced relative to each other as measured by one or more of a job count and a job weight;
divide the map into a plurality of cells, each cell having one or more pathways located within the cell each pathway having an individual measure of traversability;
determine a traversability weighting for each of the cells using its respective measure of traversability;
use at least one traversability weighting to further subdivide one or more of the plurality of sections;
pre-calculate total weights associated with one or more routes for traversing between each of said plurality of cells, wherein each total weight is calculated using the traversability weightings of a start cell, an end cell, and any intermediate cells in a route between the start cell and the end cell;
use one or more of the pre-calculated total weights to determine at least one route between a first point and a second point in the geospatial region, the first point mapped in a first cell and the second point mapped in a second cell;
determine at least one preferred route in accordance with a ranking of the at least one route between the first cell and the second cell, the ranking based on one or more efficiency criteria; where
the routing engine uses the at least one preferred route to generate an initial assignment of a service representative to travel to a first job location associated with the first point, the service representative selected from a pool of service representatives, wherein the service representative is assignable to travel to a plurality of service job locations associated with the at least one preferred route; and
a display showing an interactive dashboard comprising one or more controls for controlling the routing engine in assigning the service representative to travel to one or more of the plurality of service job locations associated with the one or more preferred routes, where the dashboard provides visual feedback of the effect of operating the one or more controls.

2. The device of claim 1 where the one or more efficiency criteria comprise route length and travel time.

3. The device of claim 1 where the one or more efficiency criteria comprise time windows and proficiency data, the proficiency data relating to individual technical proficiencies of each of one or more individuals in a pool of service representatives assignable to service job locations on the one or more routes between the first cell and the second cell.

4. The device of claim 1 where the one or more efficiency criteria comprise a route shape based on hull testing of a polygon described by the route.

5. The device of claim 1 further configured to optimize a first route by establishing a trade between the first route and a second route, wherein the trade includes exchanging one or more job locations associated with the first route with a corresponding one or more job locations associated with the second route.

6. The device of claim 1 further configured to validate each of the preferred routes based at least upon route length.

* * * * *